US012779630B2

(12) United States Patent
Su

(10) Patent No.: US 12,779,630 B2
(45) Date of Patent: Nov. 3, 2026

(54) COMPACT RATCHET WRENCH

(71) Applicant: Hong Ann Tool Industries Co., Ltd., Taichung City (TW)

(72) Inventor: Cheng-Wei Su, Taichung City (TW)

(73) Assignee: Hong Ann Tool Industries Co., Ltd., Taichung City (TW)

(*) Notice: Subject to any disclaimer, the term of this patent is extended or adjusted under 35 U.S.C. 154(b) by 352 days.

(21) Appl. No.: 18/440,084

(22) Filed: Feb. 13, 2024

(65) Prior Publication Data

US 2025/0073861 A1 Mar. 6, 2025

(30) Foreign Application Priority Data

Aug. 31, 2023 (TW) ................................ 112133037

(51) Int. Cl.

| | |
|---|---|
| ***B25B 13/46*** | (2006.01) |
| ***B25B 23/00*** | (2006.01) |
| ***B25B 23/16*** | (2006.01) |

(52) U.S. Cl.

CPC ........ *B25B 13/463* (2013.01); *B25B 23/0028* (2013.01); *B25B 23/16* (2013.01)

(58) Field of Classification Search

CPC ... B25B 13/463; B25B 23/0028; B25B 23/16; B25B 13/04; B25B 13/02; B25B 13/06; B25B 13/46; B25B 13/48; B25B 23/0007; B25B 23/0035; B25B 23/142; B25G 1/005; B25G 1/043; B25G 1/10; B25G 3/02; B25G 3/04; B25G 3/06; B25G 3/12

See application file for complete search history.

(56) References Cited

U.S. PATENT DOCUMENTS

| | | | | |
|---|---|---|---|---|
| 5,857,390 A * | 1/1999 | Whiteford | B25B 13/463 | 81/62 |
| 7,878,091 B2 * | 2/2011 | Abel | B25B 23/0028 | 81/177.9 |
| 2006/0102442 A1 * | 5/2006 | Dein | B25B 13/462 | 192/44 |
| 2013/0283983 A1 * | 10/2013 | Cummings | B25B 13/04 | 81/63.2 |

FOREIGN PATENT DOCUMENTS

| | | |
|---|---|---|
| TW | I720933 B | 3/2021 |

OTHER PUBLICATIONS

"Milwaukee 2021" Publication May 26, 2021 retrieved from: https://www.homedepot.com/p/Milwaukee-1-4-in-Drive-90-Tooth-3-in-Stubby-Ratchet-48-22-9003/315963852 (Year: 2021).*

* cited by examiner

*Primary Examiner* — Monica S Carter
*Assistant Examiner* — Christopher Soto
(74) *Attorney, Agent, or Firm* — Muncy, Geissler, Olds & Lowe, P.C.

(57) ABSTRACT

A compact ratchet wrench comprises a body and a ratchet head. The body has a head and a grip. A length between a distal end of the head and a rotation axis defines a front section length. A length between a distal end of the grip and the rotation axis defines a rear section length. An end of the ratchet head is provided with a driving portion. The driving portion has driving surfaces and a distance between two of the driving surfaces which are opposite to each other defines a drive width. The ratio of the front section length to the drive width is less than 2.5 and greater than or equal to 1. The ratio of the rear section length to drive width is less than 12 and greater than 4.

12 Claims, 11 Drawing Sheets

COMPACT RATCHET WRENCH

BACKGROUND OF THE INVENTION

The present invention relates to a ratchet wrench and, more particularly, to a compact ratchet wrench.

TW Pat. No. Patent No. I720933 discloses a hand-held tool set comprising a driving device and a rod. The driving device includes a driver and a grip. The driver extends axially and a first end of the driver has a first connecting portion. The grip is annular and surrounds an outer peripheral edge of the driver. A side of the grip opposite the driver has a holding portion, and the grip has a second connecting portion. The rod extends axially. Two ends of the rod respectively has a third connecting portion and a fourth connecting portion. The rod can selectively connect to the driving device in a first position and a second position.

The size of the driving device allows users to easily carry it wherever they go. The driver design in the middle of the grip, however, makes it difficult for the user to apply force to tighten screws.

The present invention is, therefore, intended to obviate or at least alleviate the problems encountered in the prior art.

SUMMARY OF THE INVENTION

A compact ratchet wrench comprises a body and a ratchet head. The body has a first end provided with a head and a second end provided with a grip. The head defines a cavity extending axially along a rotation axis. The body, along a length direction thereof, has a total length comprising a front section length and a rear section length. The front section length is a length between a distal end of the head which is distal to the grip and the rotation axis and the rear section length is a length between the rotation axis and a distal end of the grip which is distal to the head respectively. The ratchet head is rotatably arranged in the cavity and rotatable about the rotation axis. A first end of the ratchet head, along the rotation axis, is provided with a driving portion. The driving portion has driving surfaces and the driving surface has two opposite driving surfaces when the body is in cross section along the length direction thereof and the two opposite driving surfaces are spaced at a distance which defines a drive width. The ratio of the front section length to the drive width is less than 2.5 and greater than or equal to 1. The ratio of the rear section length to drive width is less than 12 and greater than 4.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing other structures, methods and systems for carrying out the several purposes of the present invention. It is important, therefore, that the claims be regarded as including such equivalent constructions insofar as they do not deportion from the spirit and scope of the present invention.

Further, the purpose of the abstract is to enable the public generally, and especially scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
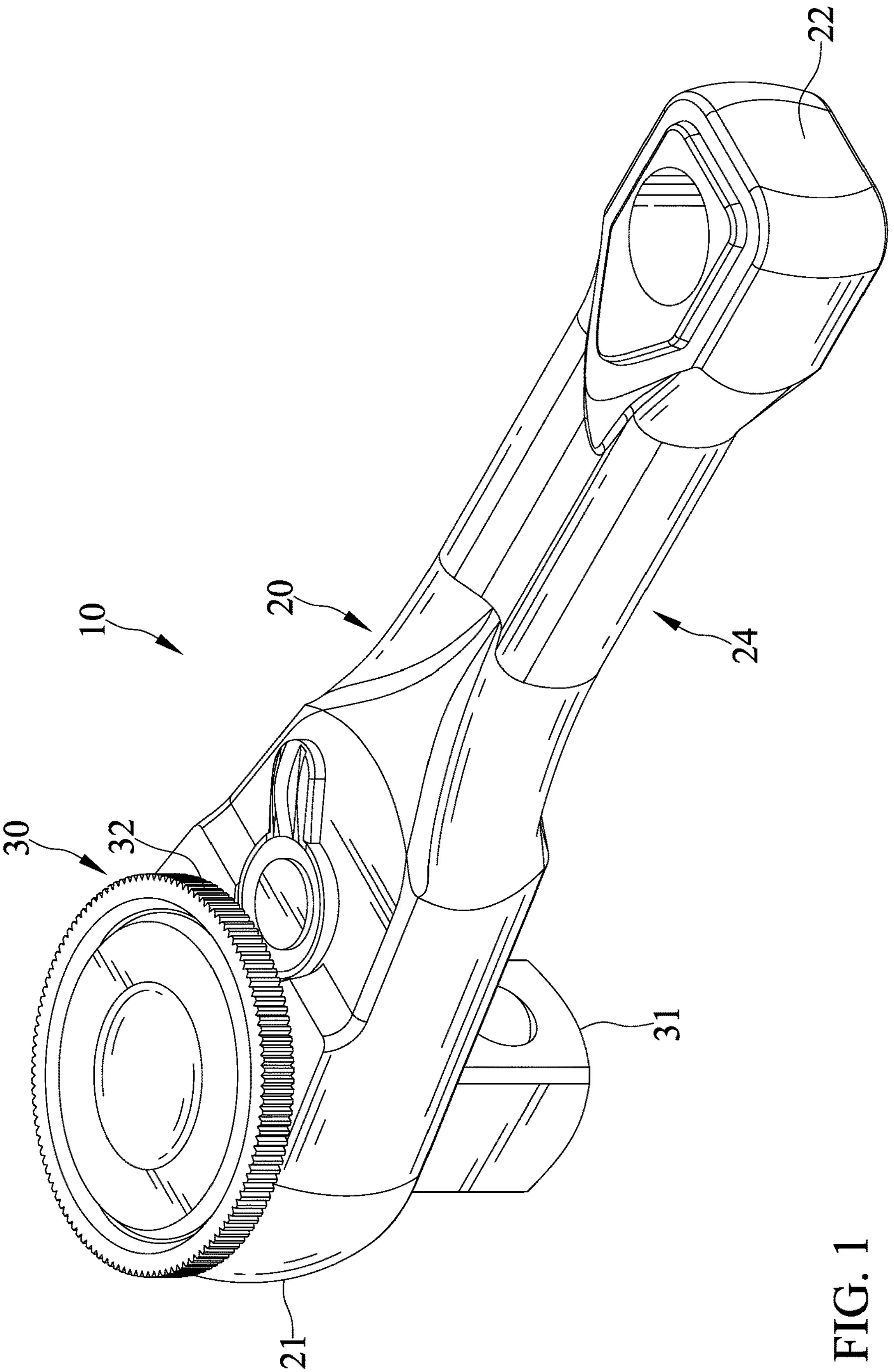
FIG. 1 is a perspective view of a compact ratchet wrench according to a first embodiment of the present invention.
Figure 2:
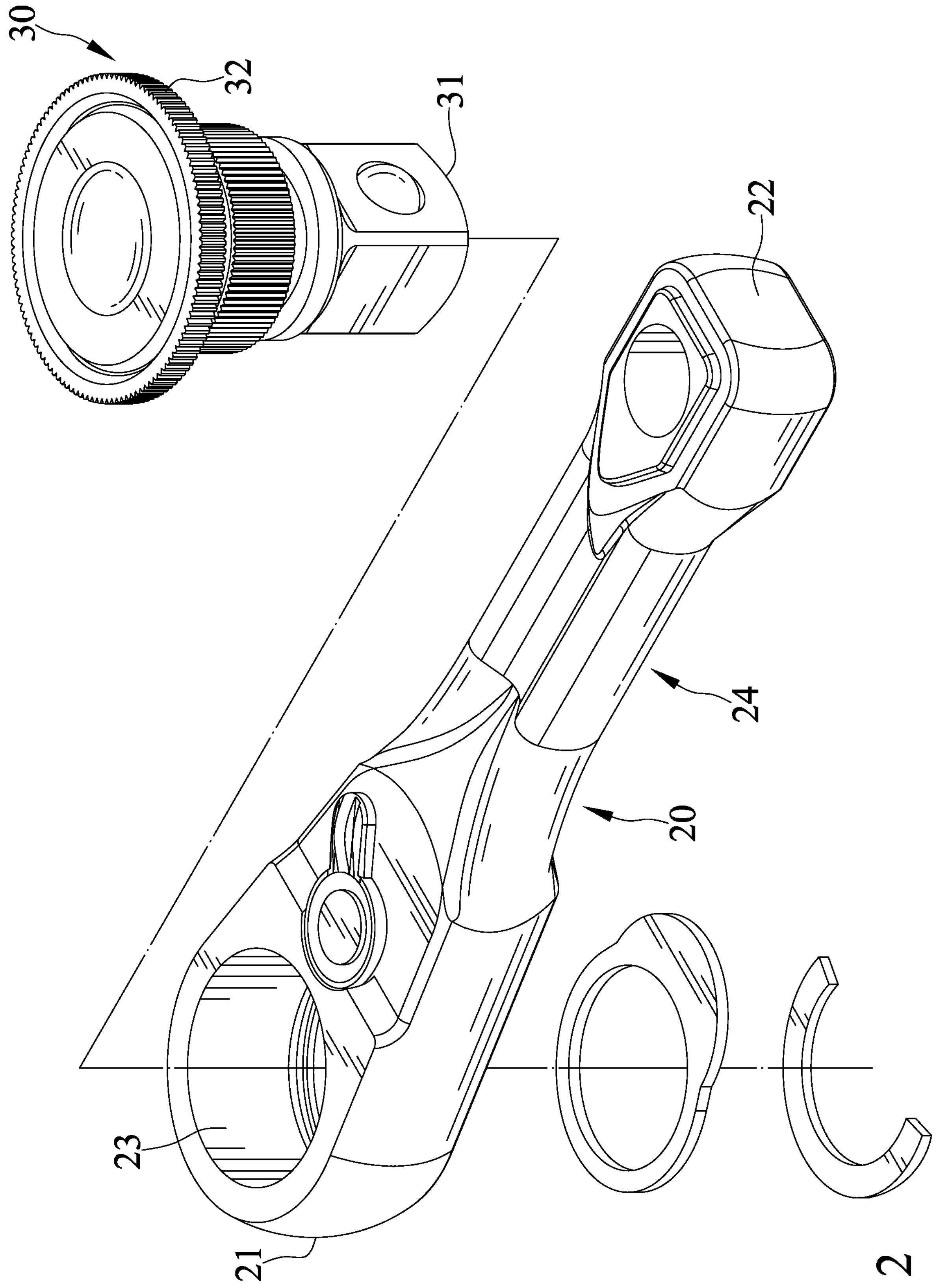
FIG. 2 is an exploded perspective view of the compact ratchet wrench of FIG. 1.
Figure 3:
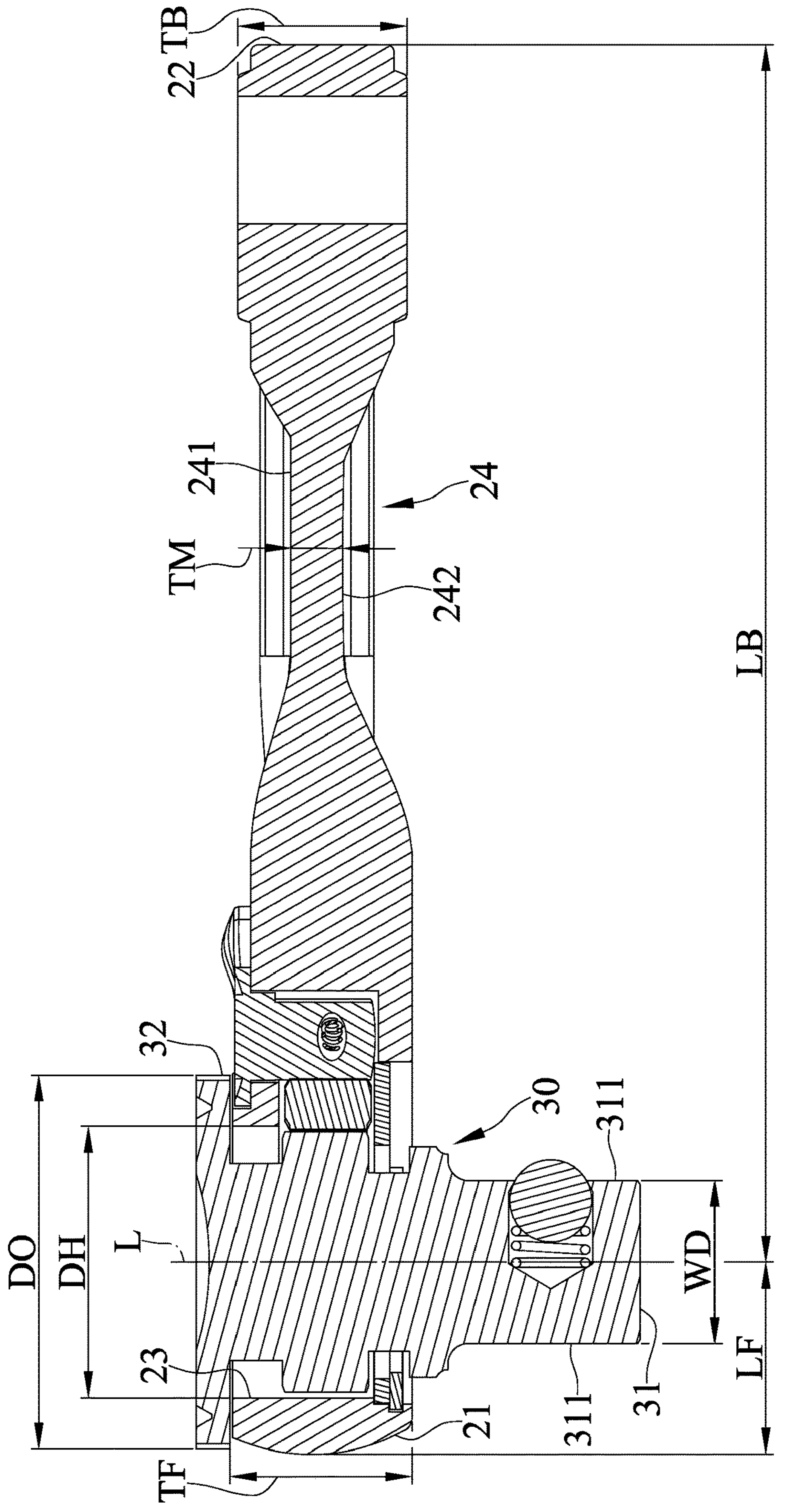
FIG. 3 is a cross-sectional view of the compact ratchet wrench of FIG. 1.
Figure 4:
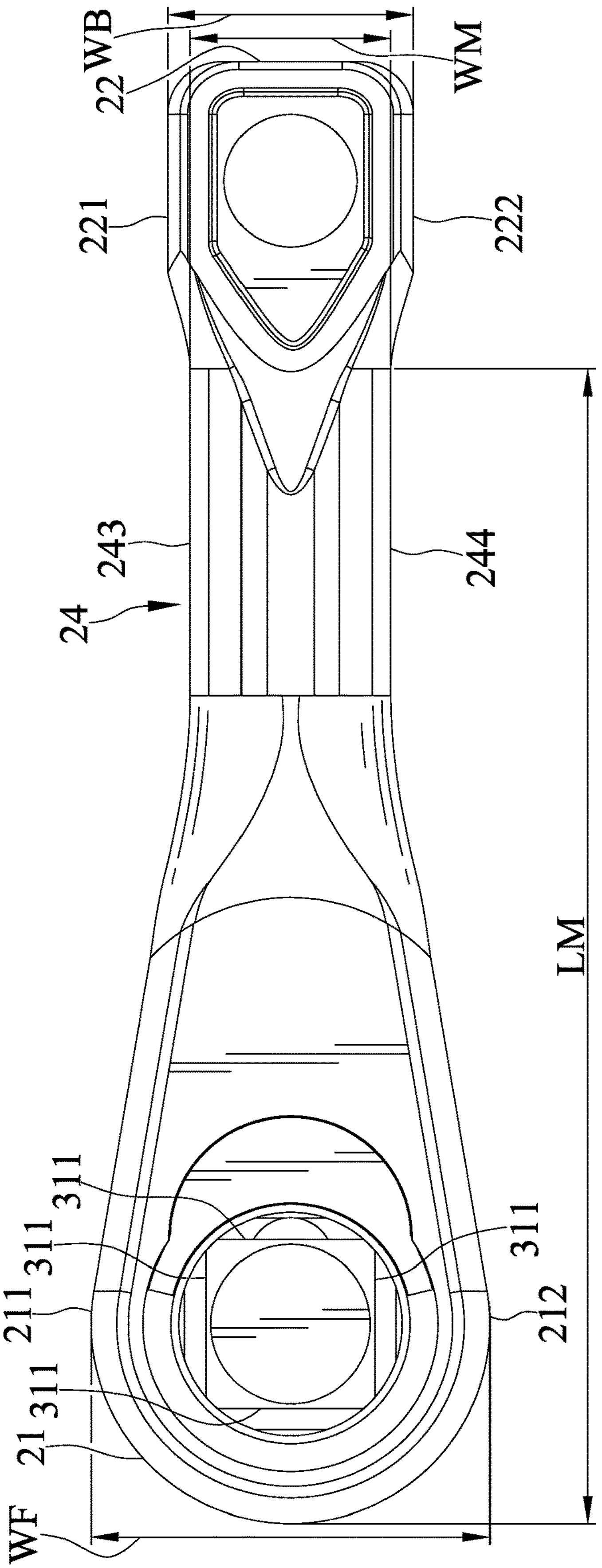
FIG. 4 is a top plan view of the compact ratchet wrench of FIG. 1.
Figure 5:
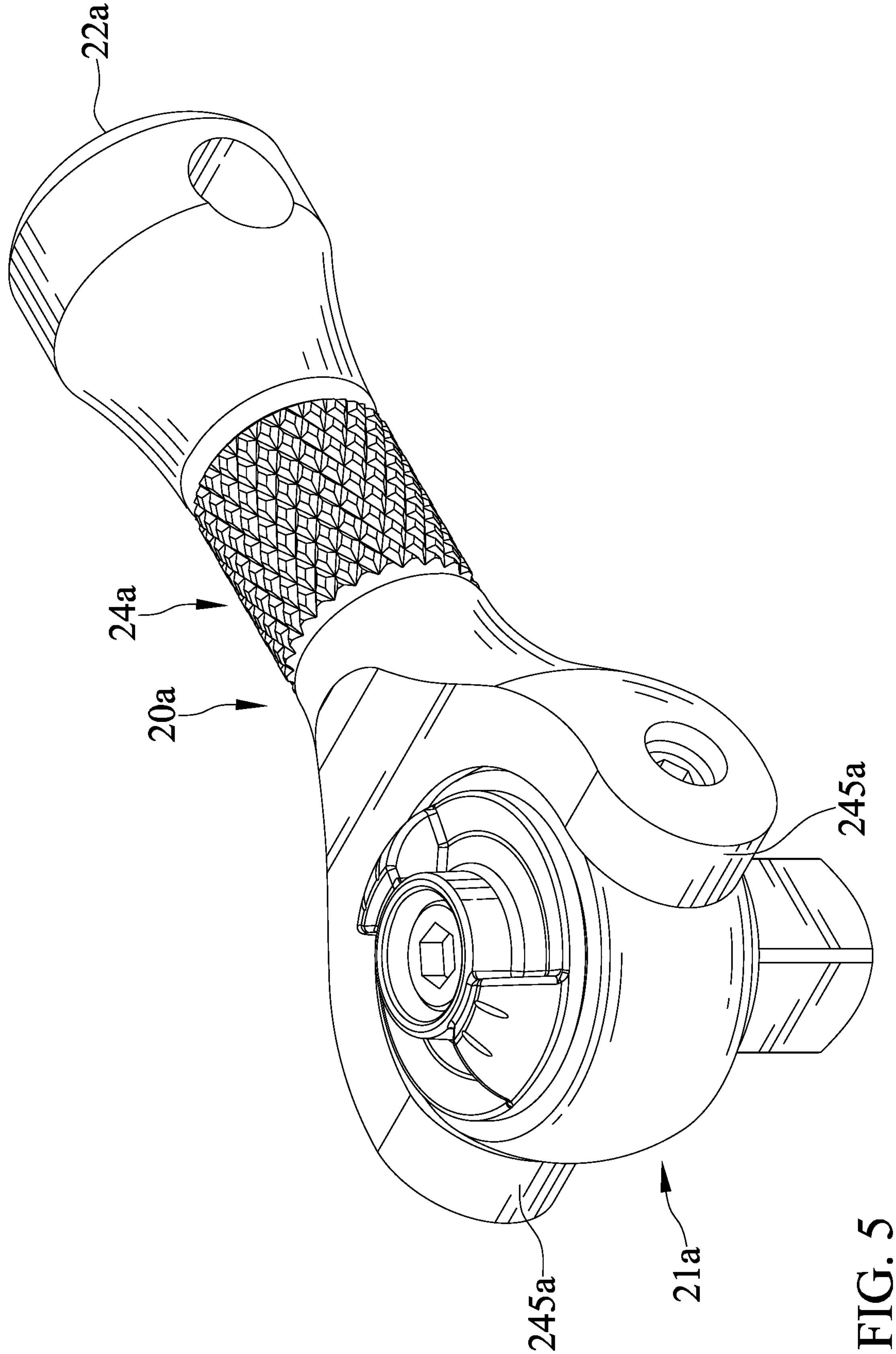
FIG. 5 is a perspective view of a compact ratchet wrench according to a second embodiment of the present invention.
Figure 6:
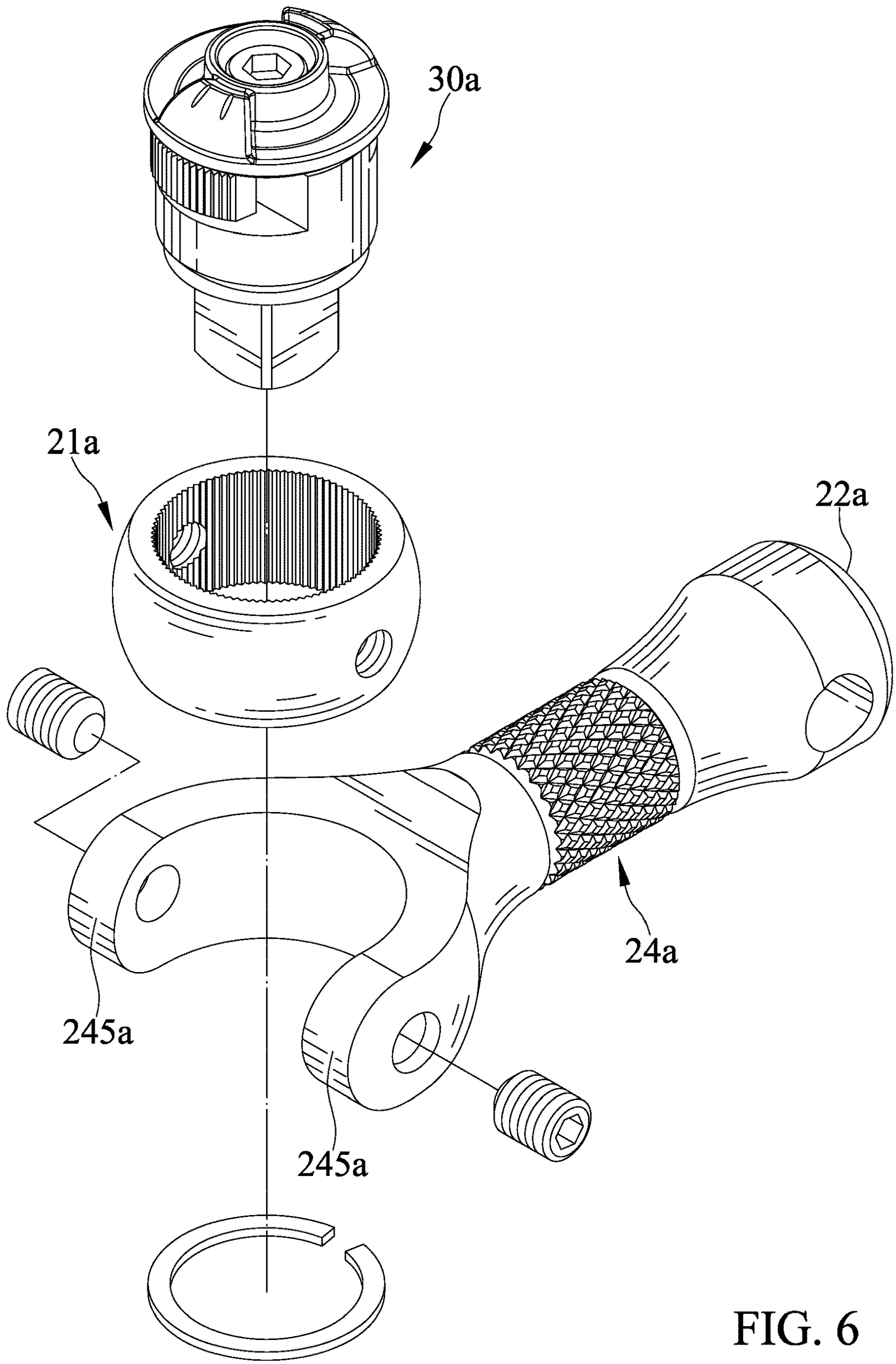
FIG. 6 is an exploded perspective view of the compact ratchet wrench of FIG. 5.
Figure 7:
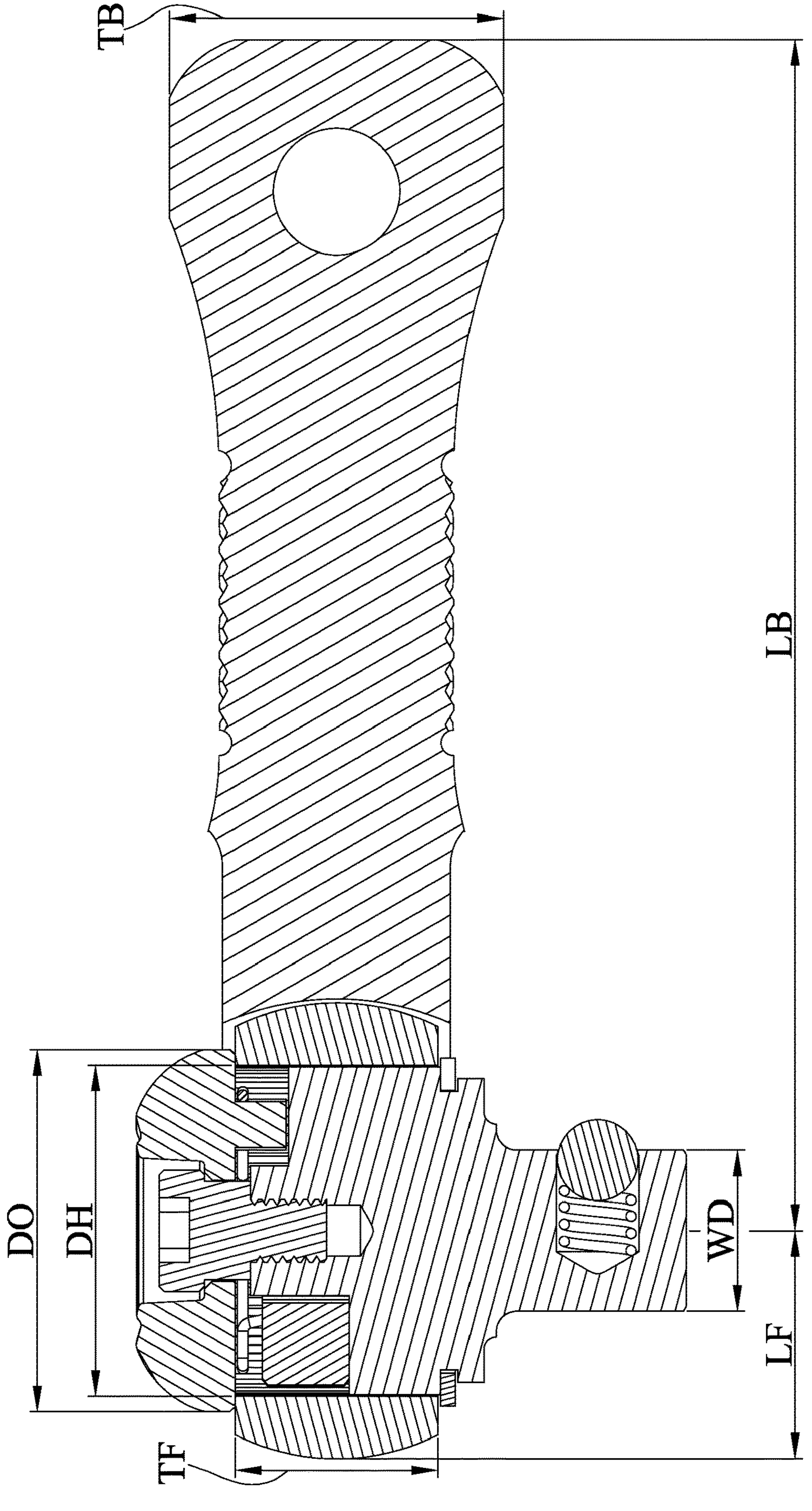
FIG. 7 is a cross-sectional view of the compact ratchet wrench of FIG. 5.
Figure 8:
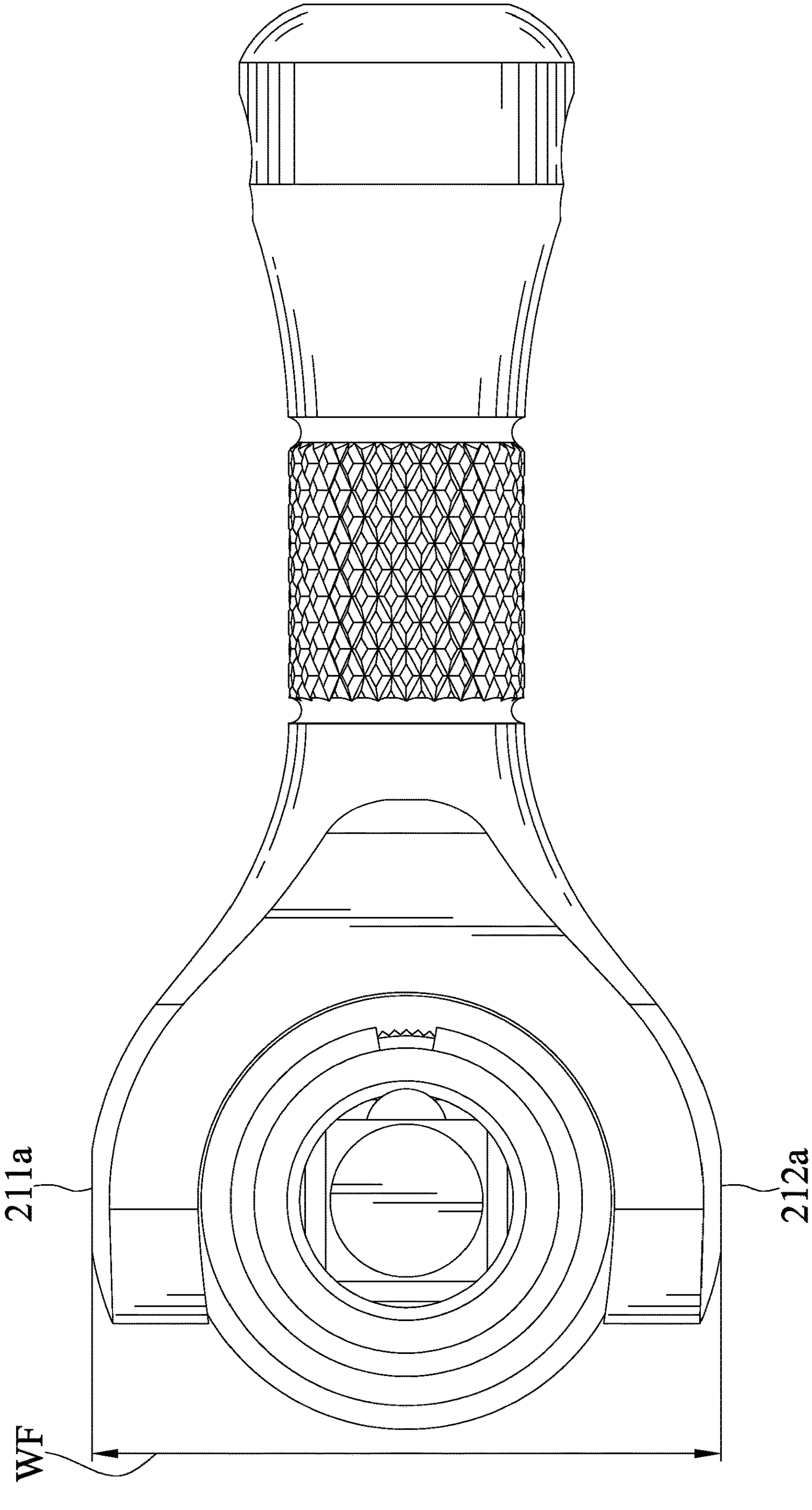
FIG. 8 is a top plan view of the compact ratchet wrench of FIG. 5.

FIGS. 1-6 show a compact ratchet wrench according to a first embodiment of the present invention. The compact ratchet wrench 10 includes a body 20 and a ratchet head 30 accommodated by the body 20.

The body 20 has a first end provided with a head 21 and a second end provided with a grip 22 respectively. The head 21 defines a cavity 23 that extends axially along a rotation axis L. The body 20, along a length direction thereof, has a total length comprising a front section length LF and a rear section length LB. The front section length LF is a length between a distal end of the head 21 which is distal to the grip 22 and the rotation axis L and the rear section length LB is a length between the rotation axis L and a distal end of the grip 22 which is distal to the head 21 respectively. The body 20, along a thickness direction thereof which is orthogonal to the length direction thereof, has a front section thickness TF and a rear section thickness TB. The head 21 has two opposite sides when the body 20 is in cross section along the thickness direction thereof and the two opposite side are spaced at a maximum distance which defines the front section thickness TF. The grip 22 has two opposite sides when the body 20 is in cross section along the thickness direction thereof and the two opposite sides are spaced at a maximum distance which defines the rear section thickness TB. The body 20, along a width direction thereof which is orthogonal to the length and thickness directions thereof, has a front section width WF and a rear section width WB. The head 21 has a left side front section 211 and a right side front section 212 opposite to each other when the body 20 is in cross section along the width direction thereof and the left and right side front sections 211 and 212 are spaced at a maximum distance which defines the front section width WF. The grip 22 has a left side rear section 221 and a right side rear section 222 opposite to each other when the body 20 is in cross section along the width direction thereof and the left and the right side rear sections 221 and 222 are spaced at a maximum distance which defines the rear section width WB.

Further, the body 20 has a middle part 24 that extends between the head 21 and the grip 22 along the length direction thereof. The middle part 24 has a top recess portion 241 and a bottom recess portion 242 opposite to each other when the body 20 is viewed in cross section along the thickness direction thereof and the top and bottom recess portions 241 and 242 are spaced at a maximum distance which defines a mid-section thickness TM. The middle part 24 also has a left side mid-section 243 and a right side mid-section 244 opposite to each other when the body 20 is viewed in cross section along the width direction thereof and the left and right side mid-sections 243 and 244 are spaced at a maximum distance which defines a mid-section width WM. The body 20 has a mid-length LM, which is the distance between the distal end of the head 21 and a distal end of the middle part 24 which is distal to the head 21 along the length direction thereof.

The ratchet wrench 10 is made such that the sum of front section length LF and the rear section length LB, i.e., the total length, is less than 83 millimeters. Further, the ratio of the front section width WF to the front section thickness TF is less than 2.3 and greater than 2. Additionally, the ratio of the rear section width WB to the rear section thickness TB is less than 1.5 and greater than 1.3. The ratio of the total length of the body 20 to the mid-length LM is less than 1.4 and greater than 1.2.

The ratchet head 30 is rotatably arranged in the cavity 23 and rotatable about the rotation axis L. A first and a second end of the ratchet head 30, along the rotation axis L, are respectively provided with a driving portion 31 and a control portion 32. The driving portion 31 is configured to engage with a workpiece to be driven. The driving portion 31 has driving surfaces 311 and the driving surface 311 has two opposite driving surfaces 311 when the body 20 is viewed in cross section along the length direction thereof and the two opposite driving surfaces 311 are spaced at a distance that defines a drive width WD. The driving portion 31 and the control portion 32 are at opposite ends of the ratchet head 30. The ratchet head 30 can be quickly rotated through the control portion 32. The control portion 32 extends around the rotation axis L. The driving surfaces 311 are arranged in such a way that the driving portion 31 has a polygonal shape.

The ratchet wrench 10 is made such that the ratio of the front section length LF to the drive width WD is less than 2.5 and greater than or equal to 1, and the ratio of the rear section length LB to drive width WD is less than 12 and greater than 4. Preferably, the ratio of the front section length LF to the drive width WD is less than 1.5 and greater than 1.1. Preferably, the ratio of the rear section length LB to the drive width WD is less than 9 and greater than 5, and more preferably, less than 7.7 and greater than 7. Further, the ratio of the front section thickness TF to the drive width WD is less than 1.4 and greater than 1. The ratio of the rear section thickness TB to the drive width WD is less than 2.2 and greater than 0.9. The ratio of a hole diameter DH of the cavity 23 to the drive width WD is less than 2.2 and greater than 1.5. The ratio of an outer diameter DO of the control portion 32 to the hole diameter DH of the cavity 23 is less than 1.5 and greater than 1. The ratio of the mid-section thickness TM to the drive width WD is less than 0.35 and greater than 0.25. The ratio of the mid-section width (WM) to the drive width (WD) is less than 1.3 and greater than 1.1.

FIGS. 5-8 show a tool section in accordance with a second embodiment of the present invention, and the same numbers are used to correlate similar components of the first embodiment, but bearing a letter a. As an initial matter, for brevity, many of the details discussed with reference to the previous FIGS. 1-4 may not be discussed or repeated hereafter. The second embodiment is similar to the first embodiment except for the following features. A body **20*a* has a middle part 24*a* extending between a head 21*a* and a grip 22*a* along a length direction thereof. The head 21*a* has two pivot ears 245*a* and a ratchet head 30*a* is pivotally arranged between the two pivot ears 245*a*. One ends of the two pivot ears 245*a* is connected to the middle part 24*a*. The head 21*a* has a left side front section 211*a* and a right side front section 212*a*, which are opposite to each other when the body 20*a* is in cross section along a width direction thereof which is orthogonal to the length direction thereof and the left and the right side front sections 211*a* and 212*a* are spaced at a maximum distance which defines a front section width WF. The left side front section 211*a* is defined on one of the two pivot ears 245*a* and the right side front section 212*a* is defined on the other of the two pivot ears 245*a*. The head 21*a* has two opposite sides when the body 20*a*** is in cross section along a thickness direction thereof which is orthogonal to the length and the thickness directions thereof and the two opposite side are spaced at a maximum distance which defines the front section thickness TF. The ratio of the front section width WF to the front section thickness TF is less than 3.3 and greater than 3.

Figure 9:
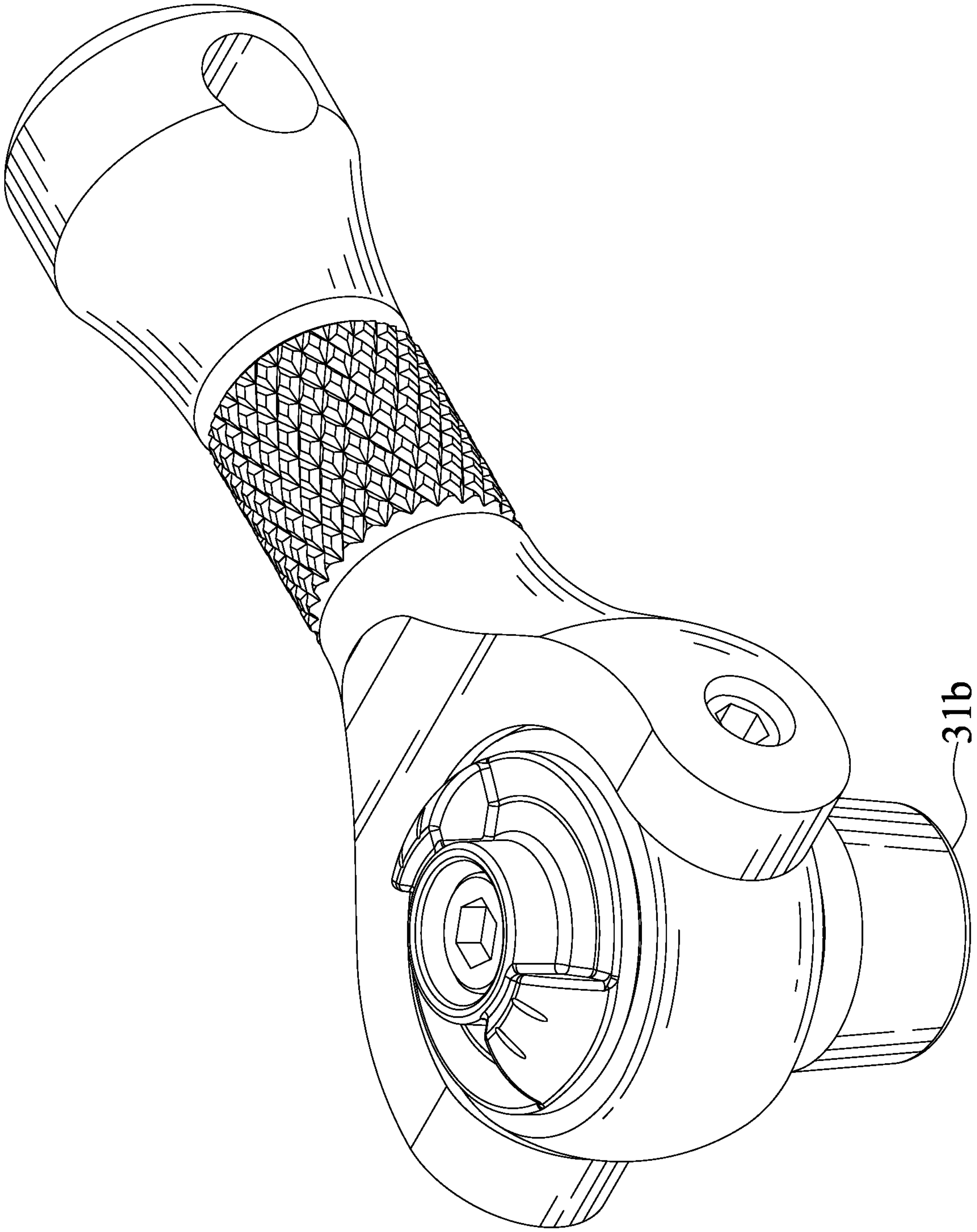
FIG. 9 is an exploded perspective view of a compact ratchet wrench according to a third embodiment of the present invention.
Figure 10:
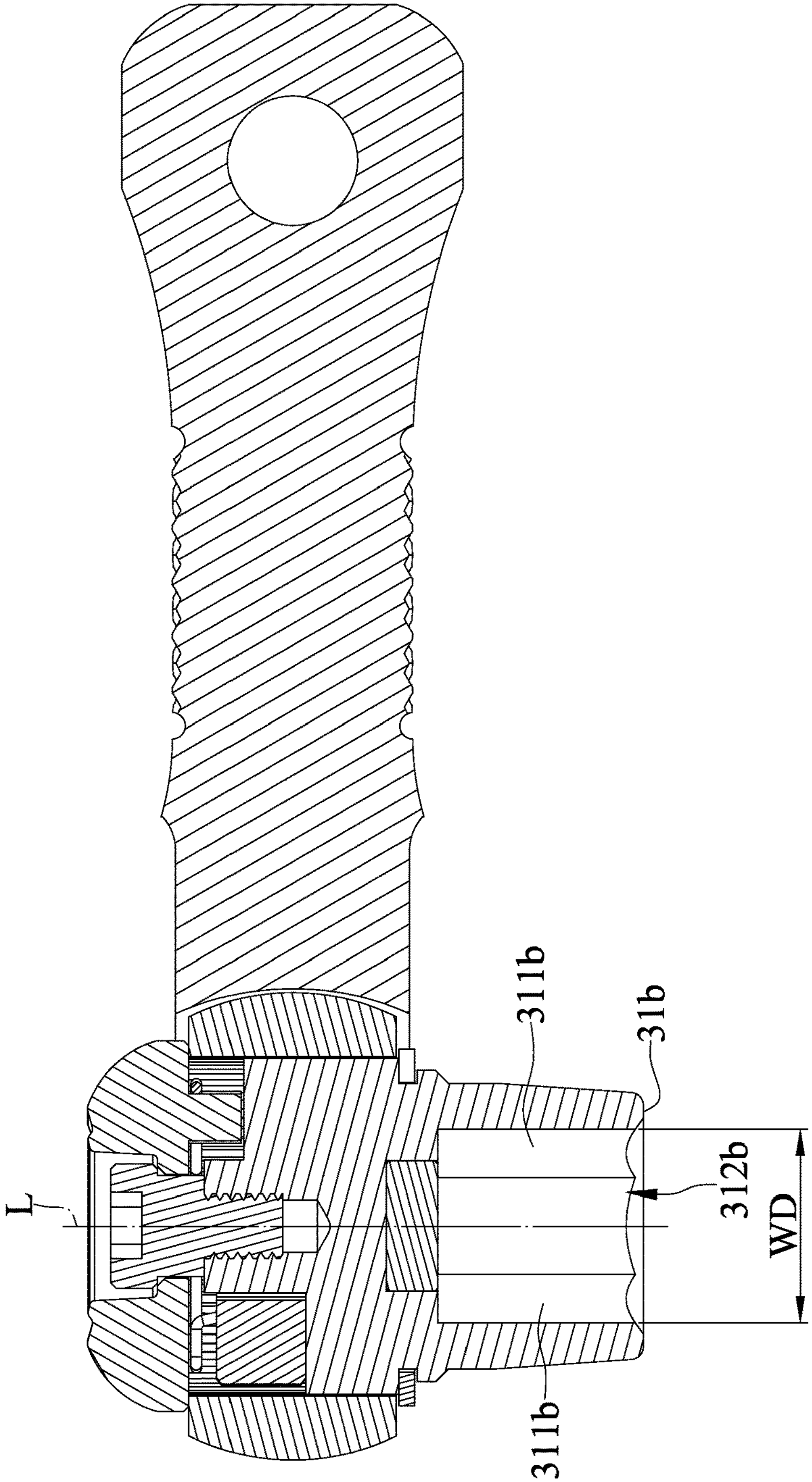
FIG. 10 is a cross-sectional view of the compact ratchet wrench of FIG. 9.
Figure 11:
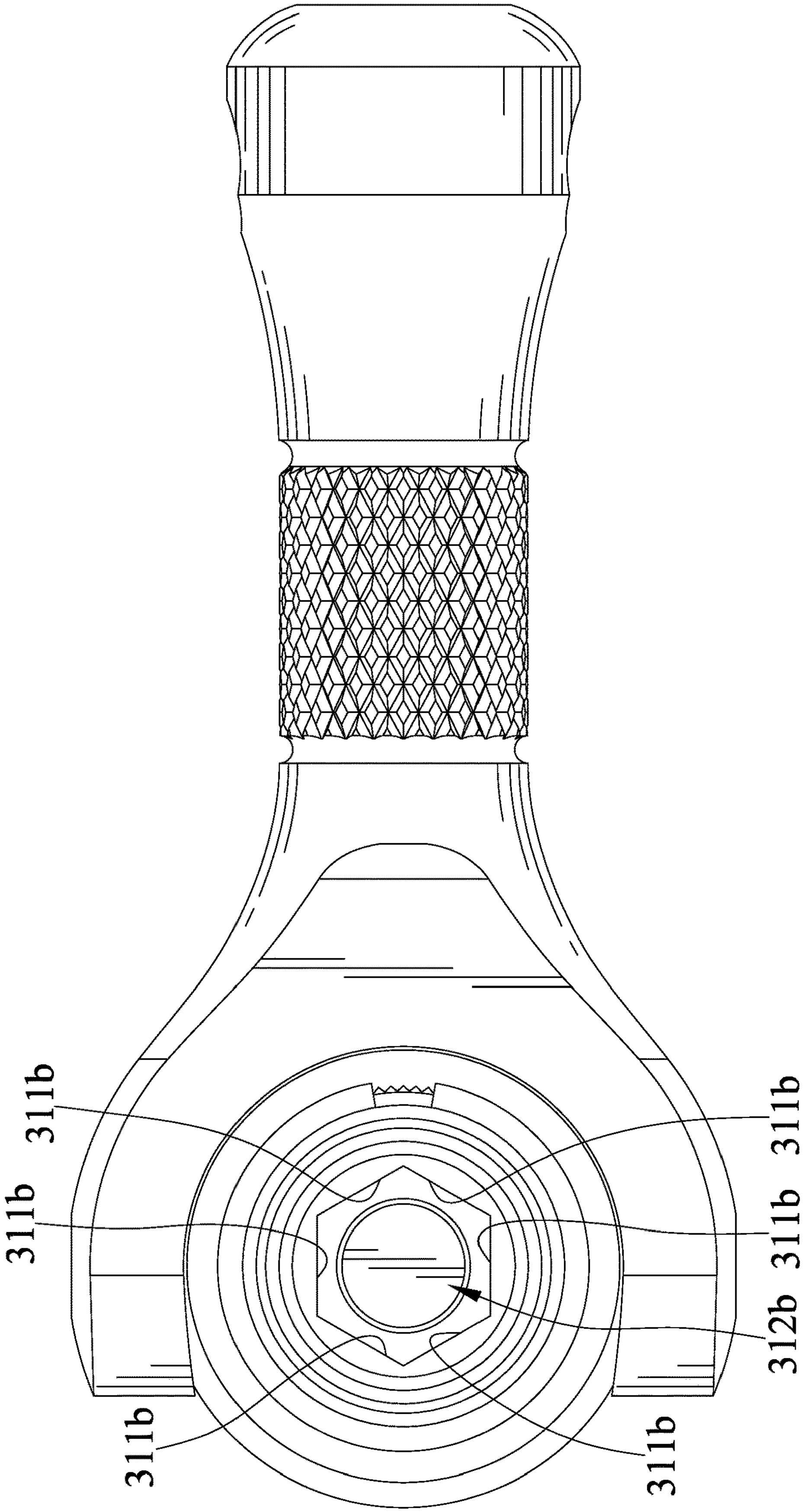
FIG. 11 is top plan view of the compact ratchet wrench of FIG. 9.

FIGS. 9-11 show a tool section in accordance with a third embodiment of the present invention, and the same numbers are used to correlate similar components of the first embodiment, but bearing a letter b. As an initial matter, for brevity, many of the details discussed with reference to the previous FIGS. 5-8 may not be discussed or repeated hereafter. The third embodiment is similar to the second embodiment except for the following features. Driving surfaces **311*b* are arranged such that a driving portion 31*b* has a polygonal shape. The driving portion 31*b* defines a hollow 312*b* and the driving surfaces 311*b* delimit an inner periphery of the hollow 312*b***.

With the ratios set forth above, the ratchet wrenches 10 are portable, and the relationships between the driving portions 31 and **31*b* of the ratchet head 30 and 30*a* and the bodies 20 and 20*a*** allow users to gain better leverage to apply force to turn a workpiece.

Although specific embodiments have been illustrated and described, numerous modifications and variations are still possible without deportioning from the scope of the invention. The scope of the invention is limited by the accompanying claims.

The invention claimed is:

1. A compact ratchet wrench comprising:

a body with a first end provided with a head and a second end provided with a grip respectively, wherein the head defines a cavity extending axially along a rotation axis, wherein the body, along a length direction thereof, has a total length comprising a front section length and a rear section length, wherein the front section length is a length between a distal end of the head which is distal to the grip and the rotation axis and the rear section length is a length between the rotation axis and a distal end of the grip which is distal to the head respectively; and a ratchet head rotatably arranged in the cavity and rotatable about the rotation axis, wherein a first end of the ratchet head, along the rotation axis, is provided with a driving portion, wherein the driving portion has driving surfaces and the driving surface has two opposite driving surfaces when the body is in cross section along the length direction thereof and the two opposite driving surfaces are spaced at a distance which defines a drive width, wherein the ratio of the front section length to the drive width is less than 1.5 and greater than 1.1, and wherein the ratio of the rear section length to drive width is less than 7.7 and greater than 7; and wherein the sum of the front section length (LF) and the rear section length (LB) is less than 83 millimeters.

2. The compact ratchet wrench as claimed in claim 1, wherein the ratio of a hole diameter of the cavity to the drive width is less than 2.2 and greater than 1.5.

3. The compact ratchet wrench as claimed in claim 2, wherein a second end of the ratchet head, along the rotation axis, is provided with a control portion, wherein the driving portion and the control portion are at opposite ends of the ratchet head, wherein the control portion extends around the rotation axis, and wherein the ratio of an outer diameter of the control portion to the hole diameter of the cavity is less than 1.5 and greater than 1.

4. The compact ratchet wrench as claimed in claim 1, wherein the body, along a thickness direction thereof which is orthogonal to the length direction thereof, has a front section thickness and a rear section thickness, wherein the head has two opposite sides when the body is viewed in cross section along the thickness direction thereof and the two opposite sides are spaced at a maximum distance which defines the front section thickness, wherein the grip has two opposite sides when the body is viewed in cross section along the thickness direction thereof and the two opposite sides are spaced at a maximum distance which defines the rear section thickness, wherein the ratio of the front section thickness to the drive width is less than 1.4 and greater than 1, and wherein the ratio of the rear section thickness to the drive width is less than 2.2 and greater than 0.9.

5. The compact ratchet wrench as claimed in claim 4, wherein the head has a left side front section and a right side front section opposite to each other when the body is viewed in cross section along a width direction thereof which is orthogonal to the length and thickness directions thereof and the left and right side front sections are spaced at a maximum distance which defines a front section width, and wherein the ratio of the front section width to the front section thickness is less than 2.3 and greater than 2.

6. The compact ratchet wrench as claimed in claim 5, wherein the grip has a left side rear section and a right side rear section opposite to each other when the body is in cross section along a width direction thereof which is orthogonal to the length and thickness directions thereof and the left and the right side rear sections are spaced at a maximum distance which defines a rear section width, wherein the ratio of the rear section width to the rear section thickness is less than 1.5 and greater than 1.3.

7. The compact ratchet wrench as claimed in claim 4, wherein the body has a middle part extending between the head and the grip along the length direction thereof, wherein the head has two pivot ears and the ratchet head is pivotally arranged between the two pivot ears, wherein one end of the two pivot ears is connected to the middle part, wherein the head has a left side front section and a right side front section opposite to each other when the body is viewed in cross section along a width direction thereof which is orthogonal to the length and thickness directions thereof and the left and the right side front sections are spaced at a maximum distance which defines a front section width, wherein the left side front section is defined on one of the two pivot ears and the right side front section is defined on the other of the two pivot ears, and wherein the ratio of the front section width to the front section thickness is less than 3.3 and greater than 3.

8. The compact ratchet wrench as claimed in claim 4, wherein the grip has a left side rear section and a right side rear section opposite to each other when the body is viewed in cross section along a width direction thereof which is orthogonal to the length and thickness directions thereof and the left and the right side rear sections are spaced at a maximum distance which defines a rear section width, and wherein the ratio of the rear section width to the rear section thickness is less than 1.5 and greater than 1.3.

9. The compact ratchet wrench as claimed in claim 1, wherein the body has a middle part extending between the head and the grip along the length direction thereof, wherein the middle part has a top recess portion and a bottom recess portion opposite to each other when the body is viewed in cross section along a thickness direction thereof which is orthogonal to the length direction thereof and the top and bottom recess portions are spaced at a maximum distance which defines a mid-section thickness, wherein the ratio of the mid-section thickness to the drive width is less than 0.35 and greater than 0.25, wherein the middle part has a left side mid-section and a right side mid-section opposite to each other when the body is viewed in cross section along a width direction thereof which is orthogonal to the length and thickness directions thereof and the left and right side mid-sections are spaced at a maximum distance which defines a mid-section width, and wherein the ratio of the mid-section width to the drive width is less than 1.3 and greater than 1.1.

10. The compact ratchet wrench as claimed in claim 9, wherein the body has a mid-length between the distal end of the head to a distal end of the middle part which is distal to the head along the length direction thereof, and wherein the ratio of the total length of the body to the mid-length is less than 1.4 and greater than 1.2.

11. The compact ratchet wrench as claimed in claim 1, wherein and the driving surfaces are arranged such that the driving portion has a polygonal shape.

12. The compact ratchet wrench as claimed in claim 11, wherein the driving portion defines a hollow and the driving surfaces delimit an inner periphery of the hollow.

* * * * *